United States Patent [19]

Ogawa

[11] Patent Number: 4,763,874
[45] Date of Patent: Aug. 16, 1988

[54] CONTROL VALVE

[75] Inventor: Hiroshi Ogawa, Suita, Japan

[73] Assignee: Fujikin International, Inc., Osaka, Japan

[21] Appl. No.: 54,040

[22] Filed: May 26, 1987

Related U.S. Application Data

[63] Continuation of Ser. No. 846,483, Mar. 31, 1986, abandoned, which is a continuation of Ser. No. 572,774, Jan. 23, 1984, abandoned.

[30] Foreign Application Priority Data

Jan. 21, 1983 [JP] Japan .............................. 58-7747[U]

[51] Int. Cl.[4] ............................................. F16K 47/00
[52] U.S. Cl. ............................... 251/122; 251/129.11; 251/214; 251/266
[58] Field of Search .............. 251/122, 129.05, 129.11, 251/129.13, 214, 266, 267, 333, 366, 367, 903; 74/424.8 VA, 424.8 R, 89.15

[56] References Cited

U.S. PATENT DOCUMENTS

| 17,973 | 8/1857 | Macdonald ........................ 251/270 |
| 703,963 | 7/1902 | Lynch ............................. 251/266 X |
| 1,557,926 | 10/1925 | Dopp .................................. 251/266 |
| 1,777,115 | 9/1930 | Bruback et al. ................. 251/267 X |
| 2,247,090 | 6/1941 | Jones et al. ..................... 251/270 X |
| 2,354,573 | 7/1944 | Brock ............................. 251/133 X |
| 2,738,684 | 3/1956 | Shafer ............................. 251/267 X |
| 2,824,460 | 2/1958 | Davis ............................. 251/133 X |
| 3,327,826 | 6/1967 | Henschke .................... 74/424.8 VA |
| 3,488,030 | 1/1970 | Hulme et al. ............. 251/129.05 X |
| 3,628,397 | 12/1971 | Sheesley .................... 74/424.8 VA |
| 4,077,606 | 3/1978 | Dussia ............................. 251/903 X |
| 4,138,091 | 2/1979 | McGee ............................. 251/267 |
| 4,313,529 | 2/1982 | Kato et al. ..................... 251/207 X |
| 4,364,541 | 12/1982 | Chabat-Courrède et al. ... 251/267 X |
| 4,499,920 | 2/1985 | Steffan et al. ................. 251/133 X |

FOREIGN PATENT DOCUMENTS

| 1550516 | 4/1970 | Fed. Rep. of Germany ...... 251/133 |
| 1238418 | 7/1960 | France .............................. 251/270 |
| 2511113 | 2/1983 | France ......................... 251/129.11 |
| 0092813 | 7/1980 | Japan .................................. 126/351 |
| 934055 | 8/1963 | United Kingdom ................ 251/214 |

OTHER PUBLICATIONS

ISA Handbook of Control Valves, 2nd Edition, J. W. Hutchinson, pp. 88, 225 and 270.

Primary Examiner—Samuel Scott
Assistant Examiner—Noah Kamen
Attorney, Agent, or Firm—Armstrong, Nikaido, Marmelstein & Kubovcik

[57] ABSTRACT

A control valve includes a pulse motor 1, the threaded shank 4 of a ball screw 3 connected to the output shaft 2 of the motor, a slider 6 united with a nut 5 on the ball screw 3, and a valve stem 8 extending outward from a valve assembly 7 and connected to the slider 6. Two cases 9 and 10, each in the form of a vertical cylinder having a bottom, are fitted together in vertical alignment, and the pulse motor 1 is placed on the upper end of the upper case 9 to close the end opening thereof, with the output shaft 2 extending into the upper case 9. The slider 6 is housed in the lower case 10 and has its peripheral wall coupled to the inner surface of the lower case 10 so as to be vertically slidable. The threaded shank 4 extends through and is rotatably supported by the bottom wall 22 of the upper case 9. The valve assembly 7 is fixed to the bottom wall 41 of the lower case 10.

10 Claims, 2 Drawing Sheets

CONTROL VALVE

This application is a continuation of application Ser. No. 846,483 filed Mar. 31, 1986, now abandoned, which is a continuation of application Ser. No. 572,774 filed Jan. 23, 1984, now abandoned.

BACKGROUND OF THE INVENTION

The present invention relates to an improvement in control valves, and more particularly to a control valve for use in mixing several kinds of fluids together in a predetermined ratio for controlling the flow rate of the fluid.

Control valves of the diaphragm type, which are usually used for such use, have the following drawbacks. First, the valve is small in rangeablility because a diaphragm is used (Rangeability is the ratio of the maximum flow to the minimum flow of both of which are controllable in the control valve). Second, the valve requires a compressed air source and piping for supplying the compressed air. Third, because compressed air is used, the valve is influenced by external conditions such as temperature, while the use of a spring for returning the diaphragm involves great hysteresis. Fourth, the necessity for compressed air, the diaphragm and the spring results in a low resolution (Resolution, as defined by the International Electrotechnical Commission, is the least interval between two adjacent discrete details which can be distinguished one from the other). Fifth, the valve is not amenable to remote control because the use of compressed air entails the problem of a pressure drop. Finally, the valve operation is not highly responsive to instructions because compressed air is further compressed when fed to the diaphragm.

SUMMARY OF THE INVENTION

The present invention provides a control valve which is free of all the foregoing drawbacks and which includes a pulse motor, the threaded shank of a ball screw connected to the output shaft of the pulse motor, a slider united with a nut on the ball screw, and a valve stem extending outward from a valve assembly and connected to the slider.

The control valve of this invention is operated by a pulse motor through a ball screw, therefore has an increased rangeability, permits use of a thin cable with optical fiber and is small in hysteresis and great in resolution. The electrically driven motor of course permits remote control. The valve, which is operated by the motor, is exceedingly higher in responsiveness than those which are operated by compressed air.

BRIEF DESCRIPTION OF THE DRAWINGS

Merely by way of example, an embodiment of the invention will be described below with reference to the accompanying drawings, in which.

DETAILED DESCRIPTION OF THE PREFERRED EMBODIMENTS

Figure 1:
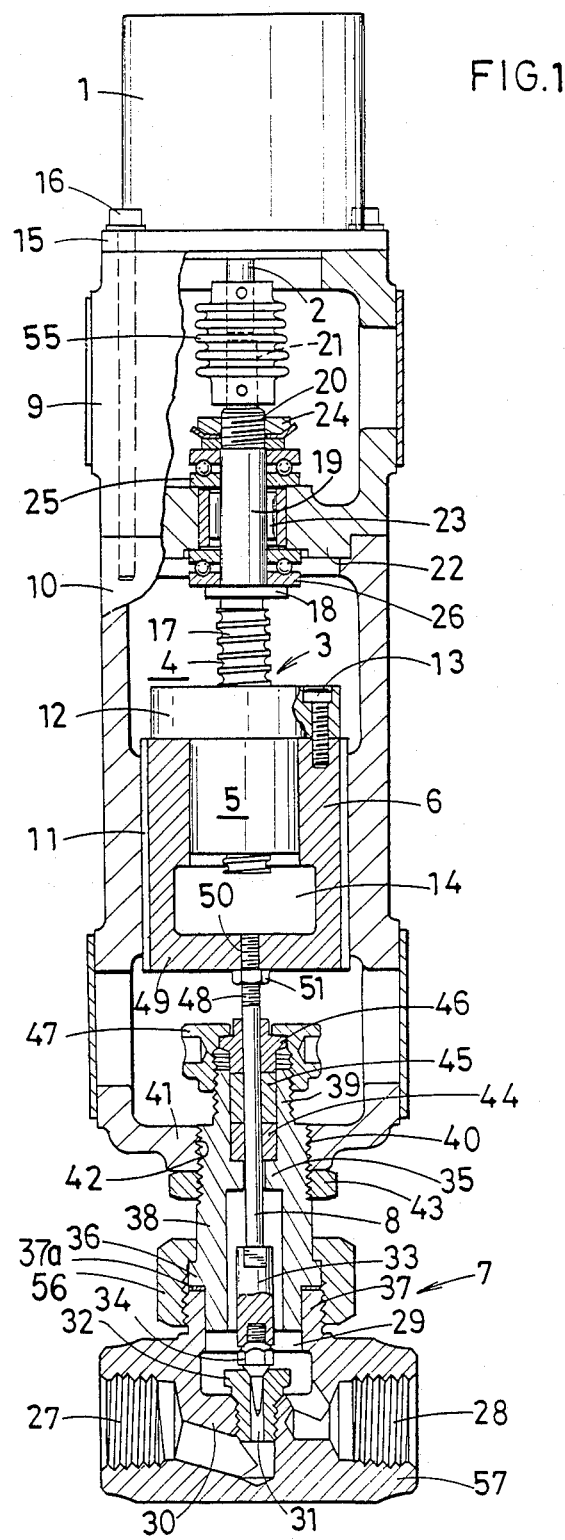
FIG. 1 is a front view partly broken away and showing a control valve according to the invention.

The illustrated control valve of the present invention includes a pulse motor 1, the threaded shank 4 of a ball screw 3 connected to the output shaft 2 of the motor, a slider 6 united with a nut 5 on the ball screw 3, and a valve stem 8 extending outward from a valve assembly 7 and connected to the slider 6.

The valve further includes two cases 9 and 10 fitted together in vertical alignment and each in the form of a vertical cylinder having a bottom. The pulse motor 1 is placed on the upper end of the upper case 9 to close the end opening, with the output shaft 2 extending into the case 9. The slider 6, which is in the form of a cylinder having a bottom, is housed in the lower case 10 and splined as at 11 to the case 10 so as to be vertically slidable. The two members can be slidably coupled together with use of a key or roller in place of the spline 11. The nut 5 is fitted into the hollow portion of the slider 6 from above, and a flange 12 formed at the upper end of the nut is fastened to the upper end of the peripheral wall of the slider 6 by a bolt 13, whereby the nut 5 and the slider 6 are united. Formed between the nut 5 and the bottom wall 49 of the slider 6 is a space 14 which has a height corresponding to the required distance of movement of the slider 6. A double nut is usable as the nut for the ball screw 3. The pulse motor 1, the upper case 9 and the lower case 10 are connected together by elongated bolts 16 extending through a flange 15 at the lower end of the pulse motor 1 and the upper case 9 into the upper end of the peripheral wall of the lower case 10. The threaded shank 4 includes a ball guide threaded portion 17 approximately over the lower half thereof and has a flange 18, an unthreaded portion 19, an externally threaded portion 20 and a reduced-diameter unthreaded portion 21 as arranged upward from the threaded portion 17 in the order mentioned. The bottom wall 22 of the upper case 9 is formed with a bore extending therethrough and having a radial bearing 23 fitted therein. The unthreaded portion 19 extends through the radial bearing 23 on the bottom wall 22 and is supported by an upper thrust bearing 25 held between the bottom wall 22 and a double nut 24 screwed on the externally threaded portion 20 and also by a lower thrust bearing 26 held between the bottom wall 22 and the flange 18, whereby the threaded shank 4 is rotatably supported by the bottom wall 22. The threaded shank 4 is connected to the output shaft 2 of the pulse motor 1 by a coupling 55 connecting the unthreaded upper end 21 of the shank 4 to the output shaft 2.

The valve assembly 7 comprises a valve body 57 having an inlet pipe socket 27, an outlet pipe socket 28 and a partition 30 between a valve chamber 29 and the inlet pipe socket 27, a valve seat 32 fixedly screwed in the partition 30 from above and having a channel 31 extending centrally therethrough, a valve element 34 fixedly screwed from below in a large-diameter portion 33 formed at the lower end of the valve stem 8, a vertical tubular closure 38 having a partition 35 slightly above the middle of its length and a flange 36 toward its lower end and fitted at its lower end portion in an externally threaded tubular portion 37 projecting upward from the valve body 57, and a nut 56 fitted over the flange 36 and screwed on the externally threaded portion 37 with a packing 37a provided on the upper end of the portion 37. The tubular closure 38 has an externally threaded small-diameter portion 39 at its upper end and an externally threaded large-diameter portion 40 under the portion 39 with a step formed therebetween. The large-diameter portion 40 is screwed in a threaded bore 42 formed in the bottom wall 41 of the lower case 10, with a lock nut 43 screwed on the portion 40 in pressing contact with the bottom wall 41, whereby the valve assembly 7 is fixed to the case 10. The valve stem 8 slidably extends through the partition 35 upward. Fitting around the valve stem 8 within the closure 38 are a packing sheet 44 on the partition 35 and a gland packing 45 on the sheet 44. A flanged gland 46 is placed on the packing 45, with its lower half fitted in the closure. A packing holding nut 47 covering the gland 46 is screwed on the small-diameter portion 39. The portion of the valve stem 8 projecting upward beyond the nut 47 is externally threaded as at 48 and screwed in a threaded bore 50 formed in the center of the bottom wall 49 of the slider 6, and a lock nut 51 is screwed on the externally threaded portion 48 in pressing contact with the bottom wall 49, whereby the valve stem 8 is connected to the slider 6.

Figure 2:
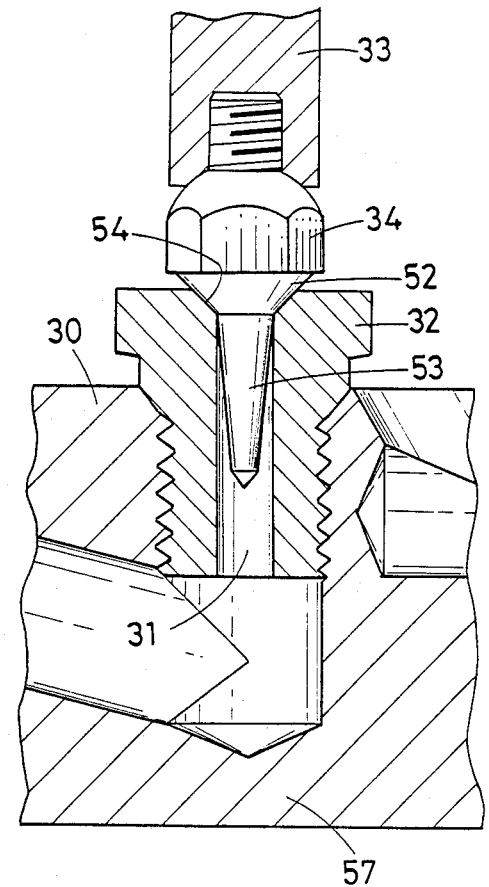
FIG. 2 is an enlarged view in vertical section showing a valve element and a valve seat.

As shown in FIG. 2, the valve element 34 is formed on its bottom side with a tapered projection 52, which is centrally provided with a tapered needle portion 53 inserted into the fluid channel 31 of the valve seat 32. The tapered projection 52 is intimately fittable in a tapered cavity 54 which is formed at the upper edge of the valve seat 32 defining the channel 31. The diameter of the upper end of the tapered needle portion 53 is equal to the diameter of the channel 31.

The operation of the control valve of the invention will now be described. When the pulse motor 1 is driven in forward direction, the output shaft 2 rotates counterclockwise as the shaft 2 of FIG. 1 is seen from above, and the threaded shank 4 of the ball screw 3 connected to the shaft rotates in the same direction. Consequently the nut 5 of the ball screw 3 and the slider 6 united with the nut descend to lower the valve stem 8 connected to the slider 6. The valve element 34 is brought into intimate contact with the valve seat 32 and closes the fluid channel 31. When the pulse motor 1 is driven reversely, the valve stem 8 of course rises to open the channel 31.

In rangeability, the conventional valve was about 30, while the valve of the present invention is about 300 and is therefore much greater than the conventional one. In resolution, the conventional valve was about 500, whereas the present valve is about 2,000 and is manifestly greater.

I claim:

1. An easily assembled and disassembled control valve comprising:
    (a) a main bifurcated case including an upper case and a lower case, joined together;
    (b) a device for converting angular motion into linear motion comprising a ball screw which includes a threaded shank and a nut associated therewith and disposed therearound, which nut is fixedly secured to a sliding body mounted axially with respect to said threaded shank and nut in said lower case, such that said sliding body is movable longitudinally in said lower case but is prevented from rotating within said lower case, wherein said upper case has a bottom wall separating said upper case from said lower case and supports said threaded shank by way of an upper thrust bearing;
    (c) a reversible electric pulse motor affixed to a free end of said upper case, having a rotating shaft extending into said upper case, and wherein said threaded shank of said ball screw extends into said upper case from a lower end of said upper case opposite said free end and adjoining said lower case, and wherein said rotating shaft and said threaded shank are joined together by a coupling in said upper case, wherein said upper and lower cases being joined together and said pulse motor being affixed to said upper case by a plurality of elongated bolts, each bolt extending through said pulse motor and upper case to be anchored in said lower case, such that said pulse motor and upper case are removable from said control valve by simply removing said elongated bolts;
    (d) a valve stem removably attached to a lower end of said sliding body;
    (e) a valve body having an inlet, an outlet and a channel, terminating in a seat, connecting said inlet and outlet, said valve body being removable connected to said lower case;
    (f) a stuffing box separating said valve body from said lower case and through which said valve stem projects, said stuffing box being removably attached to said lower case by threads on a bottom wall of said lower case cooperating with threads on a circumferential outer surface of said stuffing box; and
    (g) a tapered needle plug affixed to the end of said valve stem projecting into said channel and sealable at said seat, wherein said nut, said sliding body, said valve stem and said tapered needle are also supported by said bottom wall of said upper case.

2. The control valve of claim 1, wherein said needle plug has a tapered projection which seats on a tapered surface formed on the upper edge of said channel of said seat.

3. The control valve of claim 2, wherein said nut has a radially extending flange at an upper portion thereof, and wherein said radially extending flange is fixed to an upper surface of said sliding body.

4. The control valve of claim 3, wherein said flange is fixed to said sliding body by a bolt.

5. The control valve of claim 3, wherein said sliding body presents an aperture between a lower end of said sliding body and said nut fixed to said sliding body.

6. The control valve of claim 2, wherein said needle plug has a tapered needle portion extending from said tapered projection, the diameter of the upper end of said tapered needle portion is equal in diameter to said channel.

7. The control valve of claim 1, wherein said stuffing box includes an annular, inwardly extending partition surrounding said valve stem.

8. The control valve of claim 7, wherein said stuffing box includes,
    a packing sheet bearing against said partition, and surrounding said valve stem,
    a gland packing surrounding said valve stem and bearing against said packing sheet,
    a flanged gland surrounding said valve stem and bearing against said gland packing, and
    a packing holding nut bearing against said flanged gland and threadedly secured to a peripheral surface of said stuffing box for holding said packing sheet, gland packing and flanged gland in position between said packing holding nut and said partition.

9. The control valve of claim 8, wherein a nut is threaded onto said stuffing box and said valve body to secure said stuffing box and said valve body together.

10. The control valve of claim 9, wherein packing is provided between said valve body and said stuffing box.

* * * * *